Oct. 5, 1954 P. M. G. TOULON 2,691,151
MULTIPLE SWITCHING SYSTEMS
Filed May 22, 1950
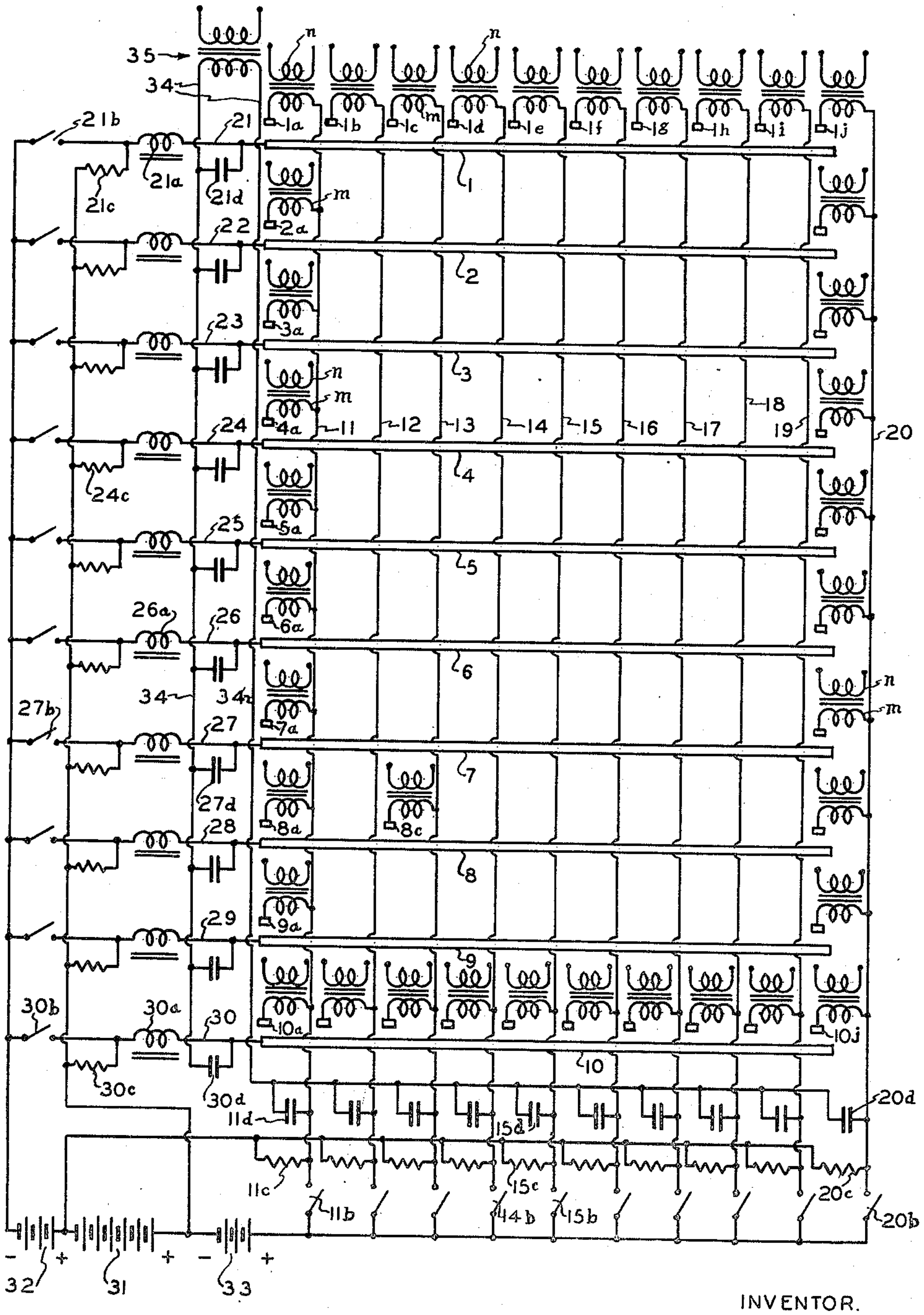
INVENTOR.
PIERRE MARIE GABRIEL TOULON
BY
ATTORNEY Patented Oct. 5, 1954

2,691,151

UNITED STATES PATENT OFFICE 2,691,151

MULTIPLE SWITCHING SYSTEMS

Pierre Marie Gabriel Toulon, New York, N. Y., assignor of seventy-five per cent to Products & Licensing Corporation, New York, N. Y., a corporation of Delaware, and twenty-five per cent to Nelson Moore and William D. Hall, as joint tenants Application May 22, 1950, Serial No. 163,534

12 Claims. (Cl. 340—166)

The present invention relates generally to a multiple switching circuit, and more particularly to a multiple switching circuit for interconnecting a plurality of circuits selectively by means of a relatively small number of space conduction devices or rectifiers.

The invention finds particular, though not exclusive, application to the selective inter-connection of telephone circuits, carrying information bearing signals, such as audio signals or the like, and is disclosed specifically as applied to the selective switching of any one of a large number of subscriber stations to a trunk line, for purpose of example only.

The invention utilizes, as an exemplary switching medium only, gaseous conduction devices having each an anode, a single cathode being common to a plurality of anodes. In tubes of this character current conduction between any anode and the cathode may be prevented by maintaining that anode at a suitable D. C. difference of potential with respect to the cathode, and current conduction between any selected anode and the cathode may be enabled by varying that D.-C. relation to a further predetermined value.

In accordance with a preferred embodiment of the invention the trunk line comprises a winding having two terminals, one of which is coupled permanently in parallel with the cathodes of all the gaseous conduction devices, and the remaining terminal of the winding is coupled permanently to all the anodes. The coupling to the anodes is accomplished in the following fashion. One anode from each of the gaseous conduction devices is connected through one coupling winding. The anodes of the gaseous conduction devices are grouped, each group comprising a single anode from each of the gaseous conduction devices, there thus being as many groups as there are anodes in a single gaseous conduction device. The anodes of any group are connected in parallel via suitable signal transfer windings to a common lead or bus-line, and the common lead or bus-lines are coupled in parallel to one terminal of the trunk line. The anodes are normally maintained all at a suitable negative potential with respect to the associated cathodes, so that no one of the anodes is capable of conveying current through its coupling winding to the trunk, or vice versa. In order to render one of the anodes in current conductive relation with respect to its cathode, selectively, the selected cathode is placed at a negative potential, while the bus bar or lead connected to the selected anode is connected to a source of positive potential. Thereby, current is enabled to flow between the selected anode and the selected cathode. While all the anodes of a group are made positive simultaneously in this way, only one cathode is made simultaneously negative, so that all but one cathode associated with an anode of the selected group remains at its normal positive potential. It follows that current flow may take place only between that anode of the selected group which is associated with the negative cathode, and accordingly that only one of the signal conducting windings is subjected to current flow.

Since the trunk line is coupled with all the anodes and cathodes, signal impressed on the trunk line passes between the conductive anode-cathode to the information bearing winding associated with the latter, all other windings remaining in closed circuit.

By means of the present system, if 10 tubes are utilized, each having a single cathode and 10 anodes, 100 subscribers circuits may be selectively connected with a trunk line, and any subscriber circuit may be selected by the closure of two switches, or, more broadly stated, by the application of two D.-C. bias voltages, one of which selects a cathode of one of the tubes, and the other of which selects a group of anodes made up of one anode from each of the tubes. While the switching circuits are illustrated and described as mechanical switches, this is for purposes of simplification only and obviously electronic means may be substituted for the mechanical switches, so that the system may be operated in response to static voltages entirely. Also, while tubes having multiple anodes and one cathode are illustrated and described, multiple tubes each with its own anode and cathode, or dry rectifiers, or electronic space conduction rectifiers may be employed instead.

It is, accordingly, a broad object of the present invention to provide a simplified system of electronic switching.

It is a further object of the present invention to provide a simplified system of selectively inter-connecting a trunk line with any one of a large number of subscriber lines.

Another object of the invention resides in the provision of a system for selective switching of a large number of circuits by means of a relatively small number of space conduction devices.

Another object of the invention resides in the provision of a selective switching system wherein a relatively large number of circuits may be selectively inter-connected by application of a relatively small number of control voltages.

The invention further provides, as an ancillary object, a system for selective switching which employs multi-anode, single cathode tubes, each anode associated with a different one of the circuits being switched.

The above and still further features, objects and advantages of the invention will become apparent upon consideration of the following detailed description of a specific embodiment thereof, especially when taken in conjunction with the accompanying drawings, wherein the single figure is a schematic circuit diagram of a switching system arranged in accordance with the invention.

Referring now more particularly to the single figure of the accompanying drawings, reference numerals 1 to 10, inclusive, represent respectively the cathodes of a plurality of gaseous conduction devices, each of which is provided with a plurality of anodes, the anodes associated with any cathode being identified by appropriate small letters following the identifying numeral of the cathode. Accordingly, the cathode 1 is provided with anodes 1*a*, 1*b*, 1*c* . . . 1*j*, and any other of the cathodes, 2 to 10, is provided with corresponding anodes. Each of the anodes is provided with a series connected load, in the form of a winding, hereinafter referred to as the *m* load or winding of the appropriate anode. Each *m* winding is in turn electro-magnetically coupled with a further winding, hereinafter dominated the *n* winding of that anode. Each anode of separate groups of anode, as 1*a* . . . 10*a*, 1*b* . . . 10*b*, is connected in series with its *m* winding to a bus-line. Separate bus-lines are provided for those anodes identified by the letter *a*, those anodes identified by the letter *b*, etc., the separate bus windings being identified by reference numerals 11, 12, 13, 14, 15, 16, 17, 18, 19 and 20. The anodes of the various tubes are thus divided into groups, each group consisting of one anode from each of the tubes, and the groups comprising anodes identified by the same identifying letter. These groups may accordingly be hereinafter referred to as the *a* group, the *b* group, the *c* group, etc.

The cathodes 1 to 10, inclusive, are connected to leads 21 to 30, respectively. These leads are provided each with a choke, and with a switch or circuit maker and breaker, identified respectively by the reference letters *a* and *b*, so that the choke 21*a* represents the choke in series with the lead 21, and the switch or circuit maker and breaker 21*b* is that which is connected in series with the lead 21.

The leads 21 to 30 are connected in parallel, at points intermediate the chokes and switches, through isolating resistances identified by the reference letter *c* taken together with the identifying numeral of the associated lead, to the positive terminal of a source of potential 31, the negative terminal of which is connected via isolating resistances 11*c*, 12*c* . . . 20*c*, respectively, to the leads or bus-lines 11 to 20, inclusive. Thereby all the anodes of all the gaseous conduction devices are maintained normally at a negative potential with respect to the cathodes, and all the gaseous conduction paths remain non-conductive.

A further source of potential 32, is provided, having its positive terminal connected to the negative terminal of the source 31, and having its negative terminal connected in parallel and directly to all the switches 21*b*, 22*b* . . . 30*b*, in such fashion that upon closure of any one of the switches the associated cathode is reduced in voltage, or assumes a negative potential. By closing the switches selectively, one only of the cathodes 1 . . . 10, may assume such negative potential, the remainder of the cathodes remaining at normal positive potential.

Similarly, a further source of potential 33 is provided, having its negative terminal connected to the positive terminal of the source of potential 31, and having its positive terminal connected in parallel and directly through switches 11*b*, 12*b* . . . 20*b*, to the leads or buses 11, 12 . . . 20, respectively. Accordingly, upon closure of any one of switches 11*b*, 12*b* . . . 20*b*, positive potential is transferred to a corresponding group of anodes, as all anodes identified by the letter *a*, or all anodes identified by the letter *b*, etc. It follows that closure of one of switches 21*b*, 22*b* . . . and of one of switches 11*b*, 12*b* . . . , results in the assumption by one cathode of the system of a negative potential, and of a group of anodes of the system of a positive potential, one only of that group of anodes being associated with the negative cathode. That one anode and cathode then provided a conductive path, and in response to signals in its *m* winding, modulation of current flow in the active tube section takes place.

A trunk line 34 is provided, having a coupling transformer 35, one winding of which is coupled at one terminal in parallel with all the cathodes 1 . . . 10, via coupling and D.-C. blocking condensers 21*d*, 22*d*, 23*d* . . . 30*d*, respectively, and the other terminal in parallel to the several groups of anodes, by being coupled in parallel through coupling condensers 11*d*, 12*d* . . . 20*d*, to the leads or bus-lines 11, 12 . . . 20, respectively.

Thereby the signal in the established conductive path is transferred to the trunk line 34, through the coupling condensers 21*d*, 22*d* . . . and 11*d*, 12*d* . . ., and similarly incoming signals applied to the trunk line 34 reach and pass through the established conductive path only, and thereby energize the associated output transformer.

It will be clear, while gaseous conduction devices each employing a single cathode and multiple anodes, are employed in the exemplary embodiment of my invention, that separate gaseous conduction devices, each having its own anode and cathode, may be substituted therefor, the cathodes being appropriately inter-connected in groups. In fact, each cathode 1, 2 . . . 10, may be conceived of as constituting 10 separate cathodes. The latter arrangements, however, lead to more complex wiring than the preferred and illustrated arrangement.

Further, the use specifically of gaseous conduction devices may be dispensed with, and any type of rectifier substituted, and I contemplate utilization of both dry and space conduction electronic rectifiers which employ no ionic conduction.

The use of transformer type load devices for the rectifiers of the system is also exemplary, and other types of conventional tube loads, such as resistances with coupling condensers, may be substituted.

While I have illustrated and described a preferred and specific embodiment of my invention, applied to a specific use, as required by the pertinent statutes, variations in detail and arrangement other than those above suggested may be resorted to without departing from the true essence and spirit of the invention.

What I claim and desire to secure by Letters Patent of the United States is:

1. In a multiple switching circuit, a plurality of groups of space conduction devices, each of said devices comprising a first and a second electrode, means commonly connecting the first electrodes of each group to maintain substantially the same D.-C. voltage thereon, means commonly connecting together said second electrodes in second groups wherein one second electrode selected from each of said groups of space conduction devices is comprised in each of said second groups, said space conduction devices each conductive only when the first electrodes thereof attain first predetermined potential and second electrodes thereof attain simultaneously each a second predetermined potential, a plurality of first transformers having each a first winding and a second winding electro-magnetically coupled to said first winding, a further transformer having a third winding and a fourth winding electro-magnetically coupled to said third winding, said third winding having a first terminal and a second terminal, means coupling said first terminal to all said first electrodes in parallel, means connecting a different one of said first winding of said first transformers each in series with a different one of said space conduction devices, means coupling said second terminal simultaneously in series with each of said first windings of said first transformers and with the space conduction devices respectively connected in series with said each of said first windings of said first transformers, means for bringing the first electrodes of any one of said groups of space discharge conduction devices simultaneously to said first predetermined potential, and means for bringing the second electrodes of any one of said second groups simultaneously to said second predetermined potential.

2. In a multiple switching circuit, a plurality of space discharge devices, each of said devices comprising a first and a second electrode, means for connecting said first electrodes in first groups and said second electrodes in second groups, any first and second group commonly including only one space discharge device, means for maintaining said first and second electrodes normally at static voltages which maintain all said space discharge devices non-conductive, means for modifying the static voltage of a selected one of said first groups of first electrodes and a selected one of said second groups of second electrodes to values which render conductive only that one space discharge device having a first electrode in the selected first group and a second electrode in the selected second group, a plurality of first signal bearing circuits, means coupling each of said first signal bearing circuits to one only of said space discharge devices, a further signal bearing circuit, and means coupling said further signal bearing circuit simultaneously to all said space discharge devices.

3. The combination in accordance with claim 2 wherein said first signal bearing circuits each comprises an impedance connected in series with one of said space discharge devices and wherein said further signal bearing circuit is connected simultaneously in series with each of said space discharge devices and its series connected impedance.

4. The combination in accordance with claim 2 wherein said space discharge devices are gaseous conduction devices.

5. The combination in accordance with claim 2 wherein said first signal bearing circuits each comprises a transformer, each of said transformers comprising two electro-magnetically coupled windings, one of said windings of each of said transformers connected in series with one only of said space discharge devices.

6. In a multiple switching circuit, a plurality of space discharge devices each comprising a cathode and an anode, means for connecting said cathodes in first groups and said anodes in second groups, any first and second group commonly including only one space discharge device, means for maintaining all said cathodes and anodes normally at static voltages which maintain all said space discharge devices non-conductive, means for modifying the static voltages of the cathodes of a selected one of said first groups of cathodes and the anodes of a selected one of said second groups of anodes to values which render conductive that space discharge device included in the selected groups, a plurality of load circuits each coupled in series with a different one of said space discharge devices, and a single further circuit connected simultaneously in series with each of said space discharge devices and its load circuit.

7. In a multiple switching circuit, a plurality of space discharge devices, each of said devices including a cathode and a plurality of anodes each in space discharge relation with said cathode, means for maintaining said cathodes and anodes normally as static voltages which maintain all said space discharge devices non-conductive, means for connecting said anodes in groups, each of said groups including one anode only from each of said space discharge devices, and means for modifying the static potential of one of said cathodes only and of all the anodes of one of said groups of anodes only to values which establish one conductive discharge path between said one of said cathodes and the anode of said one of said groups of anodes which is in space discharge relation with said one of said cathodes.

8. The combination in accordance with claim 7 wherein is further provided a plurality of first signal bearing circuits each in series with one only of said anodes, and a further signal bearing circuit, and means coupling said further signal bearing circuit simultaneously in series with each of said anodes through one of said first signal bearing circuits.

9. The combination in accordance with claim 7 wherein said space discharge devices are gaseous conduction devices.

10. In a multiple switching circuit, a plurality of rectifiers each comprising an anode and a cathode, means for connecting said cathodes in first groups and said anodes in second groups, any first and second group together including only one complete and operative rectifier, means for maintaining all said rectifiers normally at static voltages which maintain all said rectifiers non-conductive, means for modifying the static voltage of the cathodes of a selected first group of cathodes and the anodes of a selected one of said second groups of anodes to values which render conductive that complete rectifier included in the selected groups, a plurality of load circuits each coupled in series with a different one of said space discharge devices, and a further circuit connected simultaneously in series with each of said rectifiers and said load circuit.

11. In a selective switching system, a rectifier, a first circuit, a second circuit, means including said rectifier for coupling said circuits in series with each other, means for biasing said rectifier in non-conductive relation, a source of first voltage, a source of second voltage, and means for selectively applying each of said first voltage and said second voltage to said rectifier in a sense tending to overcome said biasing means, said rectifier being rendered conductive to both said first voltage and said second voltage only when both said first and second voltages are simultaneously applied to said rectifier.

12. In a selective switching system, a rectifier having an anode and a cathode, a first information bearing circuit, a second information bearing circuit, means for coupling said information bearing circuits in series with each other and with said rectifier, a source of off-biasing voltage, means for connecting said off-biasing voltage across said rectifier to maintain said rectifier normally non-conductive, a source of positive voltage selectively coupled to an anode of said rectifier, a source of negative voltage selectively coupled to a cathode of said rectifier, said rectifier being rendered conductive only when both said positive and negative voltages are simultaneously coupled to said rectifier.

References Cited in the file of this patent

UNITED STATES PATENTS

| Number | Name | Date |
|---|---|---|
| 876,701 | Drewell | Jan. 4, 1908 |
| 2,023,589 | Hersey | Dec, 10, 1935 |
| 2,291,752 | Parker | Aug. 4, 1942 |
| 2,317,471 | Meacham | Apr. 27, 1943 |
| 2,350,888 | Hall | June 6, 1944 |
| 2,434,989 | Christian | Jan. 27, 1948 |
| 2,542,672 | Hecht | Feb. 20, 1951 |
| 2,547,804 | Baker | Apr. 3, 1951 |
| 2,603,716 | Low | July 15, 1952 |